United States Patent [19]

Rozniecki

[11] 4,081,373
[45] Mar. 28, 1978

[54] MECHANISM FOR EXHAUSTING IMPURITIES FROM ENGINE FUEL

[75] Inventor: Edward J. Rozniecki, St. Clair Shores, Mich.

[73] Assignee: The United States of America as represented by the Secretary of the Army, Washington, D.C.

[21] Appl. No.: 800,665

[22] Filed: May 26, 1977

[51] Int. Cl.² .......................................... B01D 39/20
[52] U.S. Cl. ............................... 210/114; 210/167; 210/258; 210/304; 210/314; 210/512 R; 210/DIG. 5
[58] Field of Search ................... 210/23 R, 114, 115, 210/136, 167, 172, 196, 257 R, 258, 304, 314, 316, 512 R, DIG. 5

[56] References Cited

U.S. PATENT DOCUMENTS

| | | | |
|---|---|---|---|
| 2,010,435 | 8/1935 | Matheson | 210/304 X |
| 2,555,607 | 6/1951 | Robinson | 210/23 R |
| 2,922,750 | 1/1960 | Price | 210/23 R X |
| 3,016,345 | 1/1962 | Price | 210/DIG. 5 |
| 3,065,854 | 11/1962 | Winslow | 210/172 X |
| 3,088,592 | 5/1963 | Clark | 210/DIG. 5 |
| 3,187,895 | 6/1965 | Pall et al. | 210/DIG. 5 |
| 3,931,011 | 1/1976 | Richards et al. | 210/304 X |
| 4,017,390 | 4/1977 | Vicard | 210/304 X |

Primary Examiner—Charles N. Hart
Assistant Examiner—Robert H. Spitzer
Attorney, Agent, or Firm—Peter A. Taucher; John E. McRae; Nathan Edelberg

[57] ABSTRACT

In turbine engine systems liquid diesel fuel (more viscous than gasoline) has heretofore been purged of water impurity and solid impurity by a two stage system comprised of a disposable cartridge type depth filter and a water coalescer. The present invention modifies the conventional system by replacing the disposable cartridge type depth filter with an extended life cyclone; concentrated impurities are vented from the cyclone and coalescer to an additional separator mechanism. This additional separator mechanism returns purified fuel to the fuel tank; separated impurity is exhausted out of the system.

8 Claims, 4 Drawing Figures

MECHANISM FOR EXHAUSTING IMPURITIES FROM ENGINE FUEL

The invention described herein may be manufactured, used, and licensed by or for the Government for governmental purposes without payment to me of any royalty thereon.

BACKGROUND AND SUMMARY OF THE INVENTION

In the purification of liquid fuels for engines it is herein proposed to utilize a liquid cyclone and water coalescer in series flow relation between the fuel tank and engine. The cyclone is a device (usually of conical configuration) that imparts centrifugal forces to a fast-moving liquid, thereby causing heavier particles (such as dirt and/or water droplets) to remain near the outer boundary surface of the swirling liquid stream; heavy impurity settles out of the stream. The water coalescer is a device containing a porous media of hydrophobic character, i.e. a preferential ability to be wetted by oil or other non-aqueous liquid; water droplets are repelled by the media so that succeeding droplets impact thereon, eventually producing larger droplets that settle out of the flowing stream.

In the system proposed by applicant the liquid cyclone is used to remove primarily solid contaminant (e.g. dirt or wax particles); the water coalescer is used to remove water droplets that have passed through the cyclone. The cyclone and water coalescer performance is improved by continuously siphoning off some liquid fuel with the impurity; this fuel-impurity mixture is conventionally termed "underflow." The system proposed by applicant includes a relatively small auxiliary separator mechanism for treating the underflow so that fuel in the underflow is returned to the fuel tank; contaminant is discharged from the system substantially free of fuel.

Objects of the invention are to provide a fuel purification system that operates with a high efficiency, that functions with minimum energy expenditure, that takes fairly small total space in or on the engine, that produces minimum pollution of the environment, that can be manufactured at relatively low cost, that contains a minimum number of moving parts, and that has a long service life without maintenance or repair operations.

THE DRAWINGS

Figure 1:
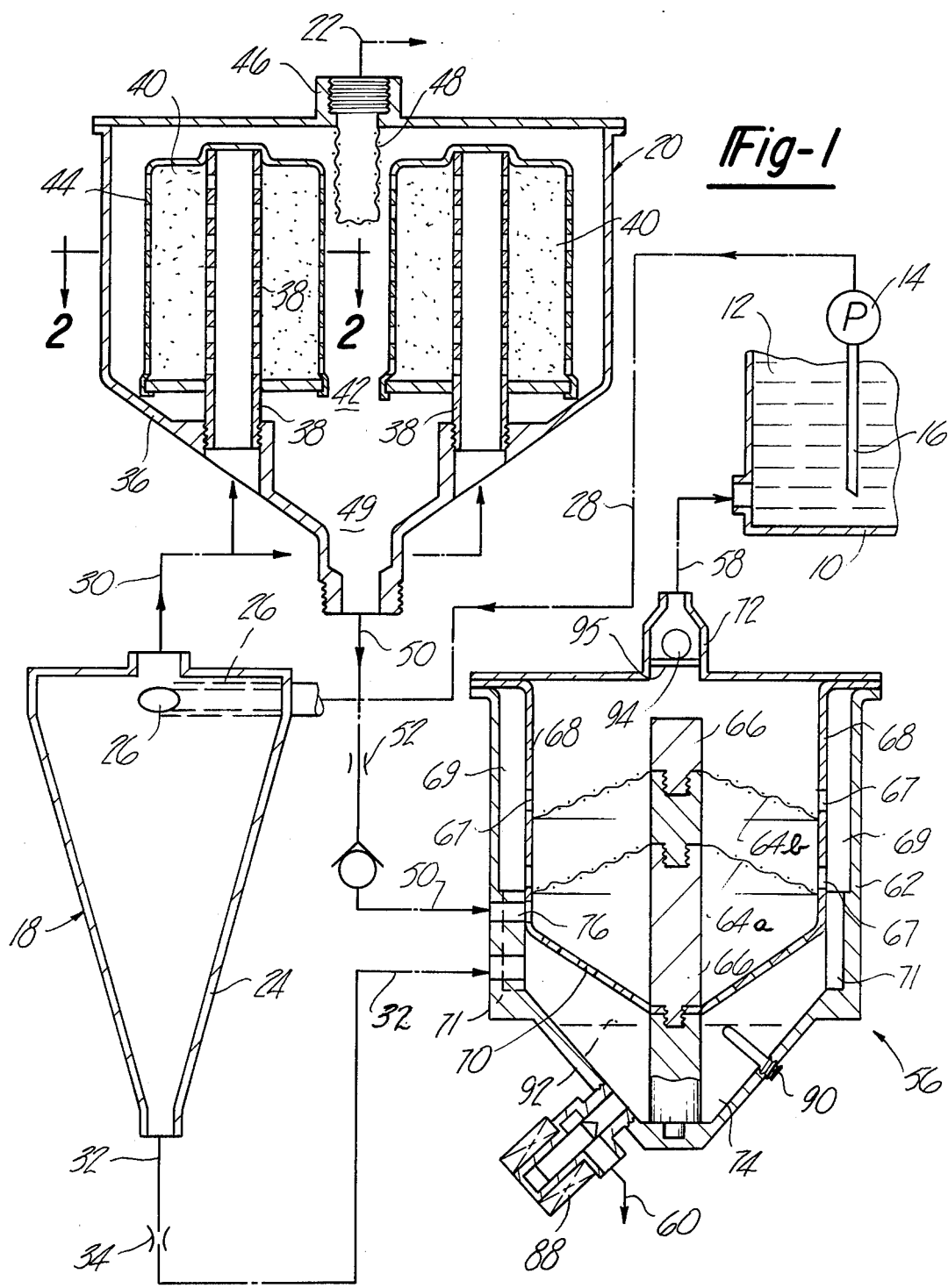
FIG. 1 is a flow diagram, partly structural and partly schematic, illustrating an impurity purge system embodying this invention.

Referring especially to FIG. 1, there is shown a portion of a fuel tank 10 containing liquid fuel 12 which may be diesel oil jet fuel JP-4, 5 or 6, or kerosene. A powered pump 14 is arranged to withdraw liquid fuel from tank 10 upwardly through a diptube 16. Eventually the fuel is introduced to the combustion chamber of a turbine or piston engine (not shown). However the fuel is first purified or purged of minor quantities of water, wax, or other solids that would interfere with the combustion process or would harm the engine, fuel pump, fuel injection systems and/or nozzles. The purification system shown in FIG. 1 of the drawings comprises a liquid cyclone 18 and water coalescer means 20, both of conventional construction except that underflow is introduced. Purified liquid fuel is directed from the coalescer means 20 through line 22 to the engine fuel injection system.

Referring now especially to cyclone 18, there is shown a conical housing 24 having a tangential inlet 26 for unpurified fuel received from pump 14 via line 28. Centrifical forces generated in the cyclone produce an overflow of relatively pure liquid fuel through line 30, and an overflow of fuel-impurity concentrate through line 32. The relative flows through lines 30 and 32 are controlled to a large extent by the adjustment or manufactured nature of a restrictor 34 in line 32. The underflow in a typical installation would range between 1% and 10% of the overflow. The cyclone removes about 98% of any solid impurities and a lesser percent (up to about 75%) of the water impurity. The separated impurities are entrained in the flow through line 32.

Referring now to water coalescer means 20, there is shown a liquid housing 36 having one or more vertical tubes 38 receiving liquid from line 30. Ports in these tubes distribute liquid to annular beds 40 of fiberglass or other hydrophobic material. As here used, the term hydrophobic refers to materials that have a preferential ability to be wetted by oil or other non-aqueous liquids. When an oil-water mixture is passed through a porous bed of hydrophobic material the material has a greater attraction for the oil than for the water so that the oil forms a replenishable skin on the bed material surfaces; water droplets are prevented from passing through or across the skin, whereas molecular forces within the oil permit the oil to flow and be replenished on the bed material pore surfaces. Water droplets are held back and are agglomerated into larger droplets. Eventually the larger water droplets tear through the oil film into the space 42 surrounding the metal cartridge 44. The now-heavier larger water droplets gravitationally settle out of the stream into the collection space 49. A chemically treated sock-like strainer screen 48 may be provided to prevent inadvertant reentrainment of the water droplets into the overflow stream discharged through outlet 46.

The lower space 49 within housing 36 constitutes a sump or collection space for water droplets separated from the purified stream of fuel designated by numeral 22. The collected water, along with some fuel, is discharged from housing 36 through line 50 as an underflow: a restriction 52 in line 50 limits the underflow to a relatively small quantity, e.g. 1 or 2% of the flow designated by numeral 22.

Figure 2:
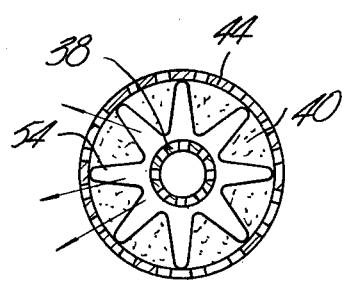
FIG. 2 is a fragmentary sectional view on line 2—2 in FIG. 1.

The water coalescer 20 is a known device used in fuel purification systems. Porous beds 40 may be constructed in various shapes and designs. As shown in FIG. 2, the porous bed is provided with a number of internal channels or grooves, formed for example by a porous pleated paper filter strip 54 oriented so that each channel communicates with a row of ports in liquid supply tube 38. The nature of the flow is designated by flow arrows in the figure. As previously noted, the structure of each water coalescer cartridge is conventional. Action of coalescers is described at pages 447 and 448 of the textbook titled "Liquid Extraction" by Robert E. Treybal, copyrighted in 1963 by McGraw-Hill Book Company, Inc.

The cyclone 18 and water coalescer 20 include underflow lines 32 and 50 for conducting fuel-impurity mixtures from the respective mechanisms. In the present invention these underflow streams are directed to an additional mechanism 56 for separating the impurity from the fuel carried along in lines 50 and 32. Mechanism 56 is constructed so that purified fuel is discharged through line 58 to tank 10; water and solid impurities are discharged through a vent line 60.

Mechanism 56 comprises an upright cylindrical housing 62 that contains two or more porous conical screens 64a and 64b formed of hydrophobic material, e.g. polytetrafluoroethylene (Teflon). The aforementioned textbook "Liquid Extraction" indicates at page 448 that other materials such as polyethylene, polypropylene, excelsior, glass wool, etc. can be used. Conical screens 64a and 64b can be supported on a central sectional post 66 suitably connected to a cup-like cartridge 68 removably positioned in housing 62; the bottom wall of the cartridge can be perforated to define a strainer screen 70. The liquid stream 34 containing primarily solid impurity is introduced into an entrance zone beneath strainer 70, such that the strainer captures solid particles as the liquid flows upwardly toward screens 64a, 64b and overhead outlet 72. The captured or retained solid particles gravitate into the settling chamber 74 defined by the lower section of housing 56. The relatively large pores in strainer 70 are not intended to capture or retain large water droplets.

Water impurity and fuel mixture from line 50 is introduced to the space above screen 70; it is not necessary to introduce this mixture below screen 70 because there is substantially no solid impurity in the line 50 stream. As liquid flows upwardly through screens 64a and 64b to outlet 72 the water droplets in the flowing stream are restrained by the hydrophobic screen material. Droplets accumulating on the underside of each screen 64a or 64b agglomerate into larger droplets and gravitationally settle into settling chamber 74. Large water droplets below screen 64a gravitate directly through screen 70 into chamber 74. Large water droplets between screen 64a and screen 64b gravitate through ports 67 into drainage passages 71, thence into chamber 74. Passages 71 form parts of a drainage system located outside the liquid flow path between inlet 76 and outlet 72.

The drainage system shown in FIG. 1 comprises two rows of drainage ports 67 in the side wall of cartridge 68. Each row of ports is located just above the edge of the associated screen 64, whereby water migrating downwardly and/or outwardly along the upper surface of the screen or the inner surface of wall 68 is caused to flow through the associated port 67. Ports 67 communicate with an annular quiescent space 69 formed between cartridge wall 68 and housing 62. Annular space 69 in turn communicates with downflow passages 71 drilled or otherwise formed in the wall of housing 62; any number of passages 71 can be used, for example eight passages equally spaced around the housing periphery. A major percentage of the water will be retained or trapped on the underside of the lower screen 64a; such retained droplets will gravitate directly through strainer 70 into the settling chamber 74.

Figure 4:
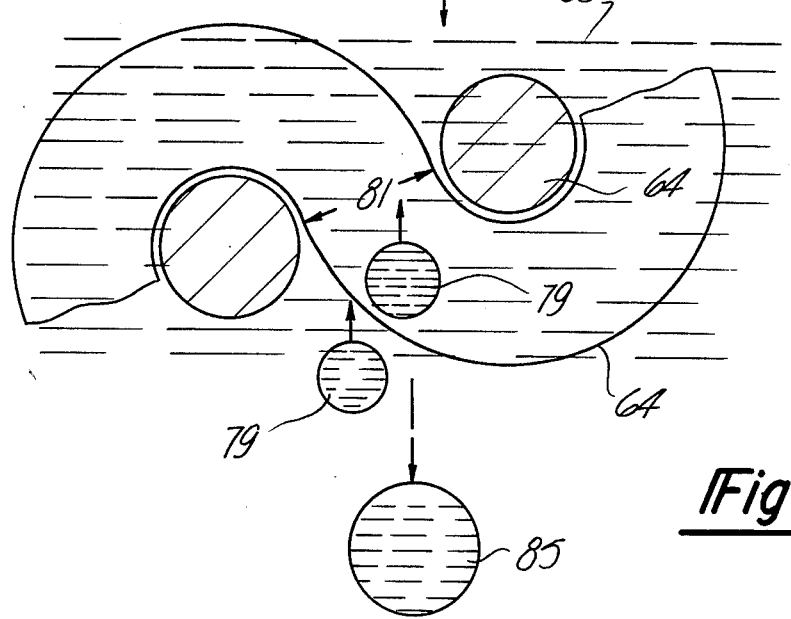
FIG. 4 is an enlarged fragmentary view through a hydrophobic screen used in the separator of FIG. 1 or FIG. 3.

FIG. 4 schematically illustrates the presumed interaction of the water, fuel and hydrophobic screen material 64a or 64b. Small upflowing water droplets 79 approach the screen pore designated by numeral 81. Oil, designated by numeral 83 is preferentially attracted or wetted to the screen 64 surfaces, thereby forming elastic barriers to upflow of the water droplets 79 through pores 81. Droplets 79 agglomerate into larger droplets 85 which gravitationally move toward settling chamber 74 (not shown in FIG. 4).

The strength of the screen 64 interfacial barrier is dependent on pore size and the interfacial surface tension values of the two liquids. To determine what differential pressure must exist across the screen for water to pass through, the following equation can be utilized.

$$P = ((I)(C)/A)$$

where
  $I$ = Interfacial tension of two immisible liquids in dynes per centimeter
  $C$ = Length of the line of contact of the interface around the periphery of one pore
  $A$ = Cross sectional area of the pore, and
  $P$ = Differential pressure For a square mesh screen:
  $A = x^2$, where $x$ is the pore width 81
  $C = 4x$
  $P = 4(I/x)$ In English units $$P = 0.00068(4)(I/x) \text{ (inches of water)} = 0.00272 (I/x)$$

$x$ = inches
$I$ = dynes per centimeter
$P$ = inches of water

With the use of fuel additives, many of which are surfactants, interfacial surface tension values of 15 dynes per centimeter or lower can be expected. Using $I = 15$ and $x = 0.002$:

$$P = 0.02272 (15)/0.002 = 20.4 \text{ inches of water}$$

Screen mesh can be selected in accordance with the expected pressure existing below the screens. Assuming a screen mesh sufficient to maintain an oil barrier in the pores of the screen, upflowing water droplets 79 will accumulate on the screen undersurface, eventually combining or agglomerating into larger and heavier droplets 85. Such larger droplets will settle into chamber 74 (directly or indirectly).

Water impurity that manages to pass through the lower screen 64a will encounter the next higher screen 64b. If this screen is made to have a smaller mesh (pore size) than the lower screen it will trap the water droplets; those droplets will agglomerate into larger droplets and either gravitate down the undersurface of the higher screen or fall directly onto the lower screen. Eventually such droplets will separate out of the upflowing stream through the ports 67 and drainage passages 71.

It is necessary that periodically the settling chamber 74 be drained of water-solid impurity (sludge). Automatic drainage may take place through a conventional normally-closed solenoid valve 88 controlled by a conventional conductivity probe 90. Various different probes, e.g. thermistor probes, can be used to energize the coil of solenoid 88 when the level of the conductive sludge rises to a suitable value, such as that designated by numeral 92 in FIG. 1.

Screens 64a and 64b operate most efficiently when completely immersed in oil. Therefore it is desirable to maintain a continuously open connection between separator mechanism 56 and line 58. At the same time it is desired that the connection be closed whenever there is a possibility for solid or water impurity to return back into tank 10 through line 58; this possibility might exist for example if the system were to remain inactive for a period of time. A fail-close connection may be provided by means of a ball 94 having a specific gravity of about 0.92 (higher than the specific gravity of fuel but lower than that of water). During normal operation ball 94 will remain in the illustrated open position resting on the crossrod 95; if mechanism 56 should for any reason fill with water ball 94 will float upwardly to close passage 58. The cyclone and coalescer are still operational, however, with zero underflow.

Figure 3:
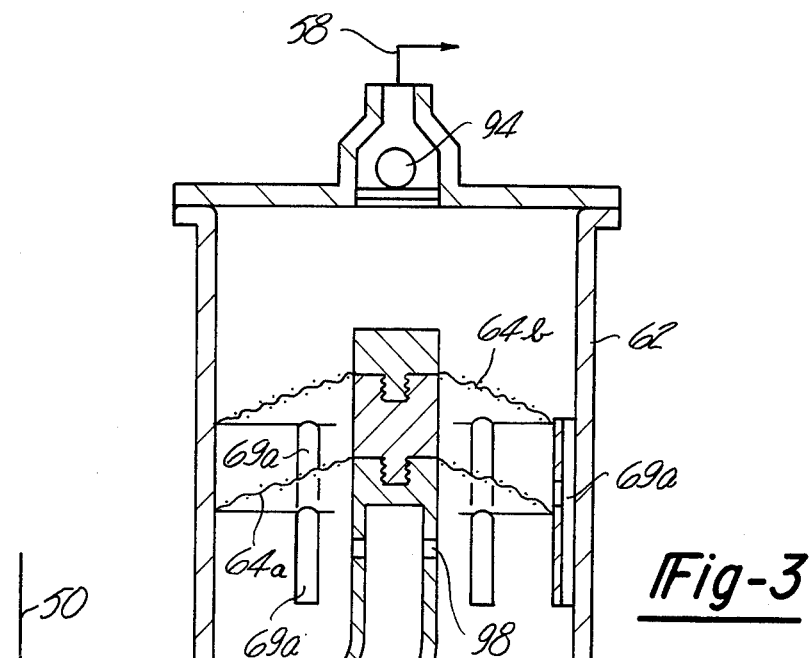
FIG. 3 illustrates a separator mechanism usable in the FIG. 1 system as an alternative for the separator thereshown.

FIG. 3 illustrates another type of construction that separator mechanism 56 might take. In this arrangement the underflows from cyclone 18 and coalescer 20 are combined prior to entry thereof into the auxiliary separator. The combined flow is fed to an L-shaped pipe 96 having a port 97 on its undersurface for discharge of primarily solid impurity; a ring of ports 98 is located near the upper end of pipe 96 for discharge of primarily water impurity. Gravitational discharge of large water droplets from the coalescer screens 64 is via two paths. One path is directly downward from the undersurface of the lowermost screen 64a to the settling chamber 74. The other path is through a number of tubes or channels 69a suitably affixed to the side wall of housing 62.

By way of recapitulation, the invention contemplates a liquid cyclone 18 and water coalescer 20 operating with high efficiency because of the presence of underflows 32 and 50. A relatively small auxiliary separator mechanism (FIG. 1 or FIG. 3) treats the combined underflows from cyclone 18 and coalescer 20 so that purified fuel is returned to the tank and concentrated water-solid impurity is exhausted to the atmosphere or other collection vessel. The auxiliary separator mechanism comprises a system of hydrophobic screens 64a and 64b for coalescing water droplets into larger, heavier droplets. The screen system is located directly above a settling chamber 74 that is equipped with a discharge valve 88. The hydrophobic screens are sloped in the direction of quiescent drainage passages 69 or 69a that bypass the main upflow passageway through the screens. Preferably the screens have decreasing pore sizes measured from the lowermost screen to the uppermost screen.

It will be noted that the only components in the system having movable parts are the solenoid valves 88. Reliability and system service life should be relatively good. The water coalescer cartridges (38,40,44) are the only components that might require periodic replacement. However these cartridges are located downstream from cyclone 18 such that most of the contaminant is removed by the cyclone before it can reach the coalescer cartridges; this lengthens the expected cartridge life before the need for replacement. For a given flow requirement the illustrated system can be relatively small. The effective size of the system is also reduced because the three major components 18, 20 and 62 can be disposed in different locations within the engine compartment; these components need not be located in close proximity to one another.

I wish it to be understood that I do not desire to be limited to the exact details of construction shown and described for obvious modifications will occur to a person skilled in the art.

I claim:

1. In an engine fuel impurity purge system comprising a liquid fuel tank: the combination comprising a conical cyclone and water coalescer means arranged in series flow relation between the tank and engine for removing solids impurity and water impurity from the fuel; each of said cyclone and water coalescer means having outlet means for discharging fuel-impurity underflow; an additional separator mechanism for returning the discharged fuel to the tank while simultaneously exhausting the impurity out of the system; said additional separator mechanism comprising a number of vertically-spaced hydrophobic screens, a settling chamber directly below the the hydrophobic screens, means for introducing fuel-impurity underflows from said outlet means of the cyclone and the water coalescer means into an entrance zone between the screens and settling chamber, fuel take-off means above the screens whereby fuel-impurity is caused to flow upwardly through the screens to reach the take-off means, a fuel return line adapted to convey purified fuel from the take-off means to the tank, and valve means controlling gravitational flow of impurity out of the settling chamber.

2. In the system of claim 1: the improvement further comprising a number of drainage passages interconnecting the screens and settling chamber; the screens being sloped to direct water droplets toward the drainage passages.

3. In the system of claim 2: the screens being upright cones, and the drainage passages being located at the outer peripheral edges of the cones.

4. In the system of claim 1: the screens having decreasing pore sizes measured from the lowermost screen to the uppermost screen.

5. In the system of claim 1: the further improvement comprising means responsive to rising water impurity level in the settling chamber for actuating the valve means to the valve-open condition.

6. In the system of claim 1: the further improvement wherein fuel-impurity concentrate from the cyclone is introduced into the entrance zone of the additional separator mechanism at a point below fuel-impurity underflow coming into the separator mechanism from the water coalescer means.

7. In the system of claim 6: the improvement further comprising a filtration screen located within the entrance zone to intercept upflowing cyclone liquid without interference with flow from the water coalescer means.

8. In the system of claim 1: the further improvement wherein the separator mechanism comprises an upright cylindrical housing having a conical bottom wall defining the aforementioned settling chamber; said hydrophobic screens comprising a stack of vertically-spaced upright conical screens arranged in the upper portion of the cylindrical housing; the cylindrical housing having at least one opening in its side wall for introduction of the fuel-impurity mixture into the aforementioned entrance zone; said housing having a number of drainage passages located around its side wall, said passages extending vertically downwardly from the peripheral edges of the conical screens to a level below the aforementioned entrance zone whereby impurity is allowed to drain from the screen edges without encountering the upflowing stream.

* * * * *